United States Patent
Gocke et al.

(10) Patent No.: US 9,838,675 B2
(45) Date of Patent: Dec. 5, 2017

(54) REMOTE 6P LASER PROJECTION OF 3D CINEMA CONTENT

(71) Applicant: Barco, Inc., Rancho Cordova, CA (US)

(72) Inventors: Alexander William Gocke, Rancho Cordova, CA (US); Goran Stojmenovik, Kuurne (BE)

(73) Assignee: Barco, Inc., Rancho Cordova, CA (US)

( * ) Notice: Subject to any disclaimer, the term of this patent is extended or adjusted under 35 U.S.C. 154(b) by 10 days.

(21) Appl. No.: 15/013,874

(22) Filed: Feb. 2, 2016

(65) Prior Publication Data

US 2016/0227199 A1 Aug. 4, 2016

Related U.S. Application Data

(60) Provisional application No. 62/111,489, filed on Feb. 3, 2015.

(51) Int. Cl.
*G03B 21/00* (2006.01)
*G03B 21/20* (2006.01)
(Continued)

(52) U.S. Cl.
CPC ......... *H04N 13/045* (2013.01); *H04N 9/3135* (2013.01); *H04N 9/3147* (2013.01);
(Continued)

(58) Field of Classification Search
CPC ............................ G03B 21/20; G03B 21/2006; G03B 21/2033; G03B 21/145; G03B 21/16;
(Continued)

(56) References Cited

U.S. PATENT DOCUMENTS

| 4,456,927 A | 6/1984 | Marin |
| 5,278,596 A * | 1/1994 | Machtig ................. F21V 23/00 348/E5.143 |

(Continued)

FOREIGN PATENT DOCUMENTS

| KR | 2014/0063534 | 5/2014 |
| WO | WO 00/45381 | 8/2000 |

(Continued)

OTHER PUBLICATIONS

PCT Search Report and Written Opinion for PCT/US16/16310 dated Apr. 13, 2016 in 23 pages.

*Primary Examiner* — Ryan Howard
(74) *Attorney, Agent, or Firm* — Knobbe, Martens, Olson & Bear, LLP

(57) ABSTRACT

A 3D laser projection systems and methods are disclosed herein. A laser projection system includes a left projector head and a right projector head, wherein a first video projected onto a movie screen by the left projector head has a first polarization and a second video projected onto the movie screen by the right projector head has a second polarization different from the first polarization. The laser projection system can include a laser light generator located a first defined distance away from the left projector head and a second defined distance from the right projector head and coupled to the left projector head and the right projector head with fiber optic cables that transmit light from the laser light generator to the left projector head and the right projector head. The laser light generator includes a laser diode configured to output light and to transmit it to the fiber optic cables.

16 Claims, 9 Drawing Sheets

(51) Int. Cl.
*H04N 9/31* (2006.01)
*H04N 13/04* (2006.01)
*G02B 27/48* (2006.01)

(52) U.S. Cl.
CPC ....... *H04N 9/3161* (2013.01); *H04N 13/0459* (2013.01); *H04N 13/0497* (2013.01); *G02B 27/48* (2013.01); *G03B 21/003* (2013.01); *G03B 21/2033* (2013.01)

(58) Field of Classification Search
CPC .... H04N 9/3141; H04N 9/3147; H04N 9/315; H04N 9/3161; H04N 9/3164; H04N 9/3167
USPC .................................................. 353/7, 8, 94
See application file for complete search history.

(56) References Cited

U.S. PATENT DOCUMENTS

| | | | |
|---|---|---|---|
| 5,721,738 A | 2/1998 | Kubota et al. | |
| 6,122,000 A | 9/2000 | Yee et al. | |
| 6,269,127 B1 | 7/2001 | Richards | |
| 6,309,072 B1 * | 10/2001 | Deter ....................... | H04N 9/12 348/750 |
| 6,988,803 B2 * | 1/2006 | Maximus ........... | H04N 13/0459 348/E13.038 |
| 7,012,906 B1 | 3/2006 | Song | |
| 7,068,278 B1 | 6/2006 | Williams et al. | |
| 8,094,100 B2 | 1/2012 | Mozusako et al. | |
| 8,459,803 B2 * | 6/2013 | Plut ..................... | H04N 9/3117 353/30 |
| 2002/0159035 A1 | 10/2002 | Koyama et al. | |
| 2003/0153321 A1 | 8/2003 | Glass et al. | |
| 2003/0179782 A1 | 9/2003 | Eastty | |
| 2007/0097334 A1 | 5/2007 | Damera-Venkata et al. | |
| 2007/0276670 A1 | 11/2007 | Pearlstein | |
| 2009/0036159 A1 | 2/2009 | Chen | |
| 2009/0172028 A1 | 7/2009 | Benitez et al. | |
| 2011/0158120 A1 | 6/2011 | Hamasaki et al. | |
| 2011/0234474 A1 | 9/2011 | Natori et al. | |
| 2012/0050698 A1 * | 3/2012 | Kotani ................... | G03B 21/14 353/94 |
| 2012/0159026 A1 | 6/2012 | Kataoka et al. | |
| 2012/0319997 A1 | 12/2012 | Majumder | |
| 2013/0120525 A1 | 5/2013 | Yoon et al. | |
| 2013/0222557 A1 | 8/2013 | Kuo et al. | |
| 2013/0258209 A1 | 10/2013 | Tocze et al. | |
| 2013/0300948 A1 | 11/2013 | Jannard et al. | |
| 2103/0326568 | 12/2013 | Tanaka et al. | |
| 2014/0035904 A1 | 2/2014 | Ge | |
| 2014/0078399 A1 | 3/2014 | Frouin et al. | |
| 2014/0152784 A1 | 6/2014 | Mccoy et al. | |
| 2014/0168277 A1 | 6/2014 | Ashley et al. | |
| 2014/0184914 A1 | 7/2014 | Oshima et al. | |
| 2015/0138511 A1 * | 5/2015 | Domm ................. | G02B 27/106 353/31 |
| 2015/0348558 A1 | 12/2015 | Riedmiller et al. | |
| 2016/0080710 A1 | 3/2016 | Hattingh et al. | |

FOREIGN PATENT DOCUMENTS

| | | |
|---|---|---|
| WO | WO 2009/105838 | 9/2009 |
| WO | WO 2010/141150 | 12/2010 |
| WO | WO 2016/069175 | 5/2016 |
| WO | WO 2016/126783 | 8/2016 |

* cited by examiner

REMOTE 6P LASER PROJECTION OF 3D CINEMA CONTENT

CROSS-REFERENCE TO RELATED APPLICATIONS

This application claims priority to U.S. Prov. Pat. App'n No. 62/111,489, entitled "REMOTE 6P LASER PROJECTION OF 3D CINEMA CONTENT," filed Feb. 3, 2015, the entire contents of which is hereby, incorporated by reference.

BACKGROUND

The present disclosure generally relates to laser-based projection technology inside movie cinemas. In particular, the present disclosure relates to synchronized laser projectors inside the auditorium of a movie theater that are fiber-coupled to a laser source inside a cinema booth.

SUMMARY

Many movie theaters use xenon electric arc-lamps in digital projectors. In some cases, picture quality produced by xenon electric arc-lamps can degrade over time due to the decreased brightness of the bulbs of the lamps. Replacing the bulbs may also be expensive, and the brightness of the bulbs may be limited due to size constraints. The shortcomings of xenon electric arc-lamps are further exacerbated by the demands of 3D presentations. Presently, most 3D movies are shown by flashing left- and right-eye images sequentially though a single projector. For example, the projector may alternate polarizations by switching an electro-optical polarizing filter. The viewer may wear eyeglasses that have corresponding polarization filters so that the appropriate image reaches each eye. The separation of images between the left eye and right eye creates the perception of a 3D image. However, each of the polarizing steps (e.g., passing light through the electro-optical polarizing filters and the eyeglasses) results in an overall loss of light. In some cases, the amount of light reaching a viewer's eyes can be as little as 10 percent of the light originating from the projector. This loss of light, compounded with the continued dimming of the bulbs of xenon electric arc-lamps, causes images to dim and lose visual effect. Secondary effects can also include viewer fatigue, headaches, nausea, and/or motion sickness when viewing 3D content.

Laser projection systems may be an alternative to xenon electric arc-lamps in theaters. Laser projection systems can output more light by focusing their power. As a result, they consume less energy and can output near-constant and highly controllable light. However, implementing laser projection systems may have its challenges as well. In some cases, laser projectors may create visual artifacts due to rays of laser light reflecting off rough screen surfaces, and constructively and destructively interfering with each other. This effect is called "speckle" and can cause screen pictures to appear as if they are shimmering and/or moving. Solutions to the speckle issue have involved using low-speckle projection surfaces and combinations of lasers with polarization diversity, angle diversion, and wavelength diversity. Some example methods are described in U.S. Pat. No. 8,872,985, which is incorporated herein by reference in its entirety.

Moreover, even when the speckle issue is addressed, laser projectors may suffer from inefficiencies, especially when operating in 3D. For example, some 3D laser projector systems utilize two projectors designated as left- or right-eye projectors. Each is separately connected to its own set of distinct laser engines. Such a configuration produces high image quality with minimal speckling, but the cost of having the duplicity of equipment may be substantial. Also, the additional equipment may add layers of complexity, which may lead to the introduction of errors and/or system slowdown. Accordingly, there is a need in the art for more efficient 3D projector systems.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION OF THE PREFERRED EMBODIMENT

Although certain embodiments and examples are disclosed herein, inventive subject matter extends beyond the specifically disclosed embodiments to other embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Figure 1:
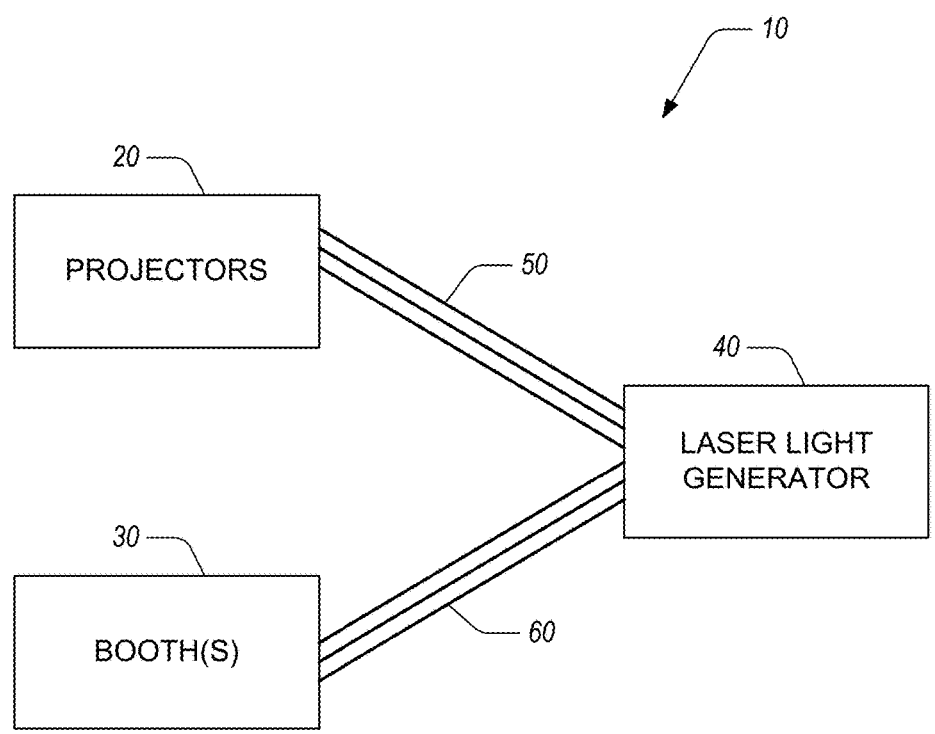
FIG. 1 illustrates a high-level diagram of an example embodiment where an external laser light generator is connected to remote systems by fiber optic cables.

FIG. 1 illustrates a high-level diagram of an example embodiment where an external laser light generator 40 is connected to remote systems by fiber optic cables. Laser projection system 10 has a centralized laser light generator 40, which may contain the light engines that produce light for laser projection system 10. The light from laser light generator 604 may be transmitted to other systems, such as projectors 20 and/or booths 30, through fiber optic cables, such as fiber optic cables 50 and 60. For example, projectors 20 may comprise a plurality of projectors, including 1, 2, 3, 4, 5, 6, 7, 8, 9, 10, or more than 10 projectors. Each projector in projectors 20 may be connected in parallel to laser light generator 40 through fiber optic cables 50, which transmit light from laser light generator 40 to each projector. Laser light generator 40 may also be connected to booths 30, where each booth in booths 30 may be connected in parallel to laser light generator 40 through fiber optic cables 60. Fiber optic cables 60 may transmit light from laser light generator 40 to booths 30. Booths 30 may include projectors and/or other equipment for projecting a cinema presentation. The laser light generator 40 can be located in a different room from the booths 30 and/or projectors 20. In some embodiments, the laser light generator 40 is on a different floor from the booths 30 and/or projectors 20.

For illustrative purposes, the following examples describe two projector systems, however, a person having ordinary skill in the art should appreciate that embodiments may contain more than two projectors, such as 3, 4, 5, 6, 7, 8, 9, 10, or more than 10 projectors.

Figure 2:
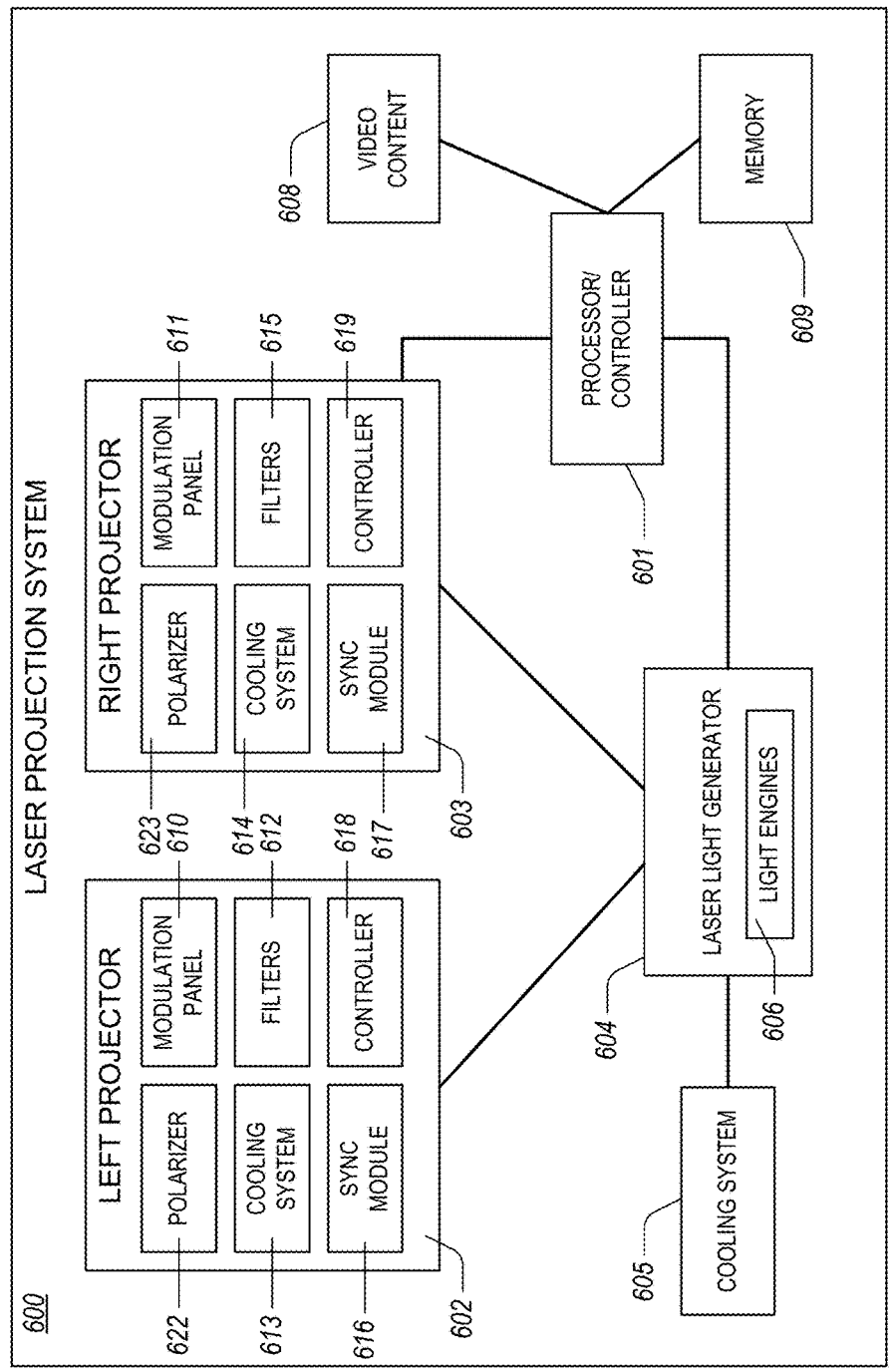
FIG. 2 illustrates an example functional block diagram of an example embodiment of a 6P laser projection system having two projectors connected to a centralized laser generator by fiber optic cables.

FIG. 2 illustrates an example functional block diagram of an example embodiment of a 6P laser projection system having two projectors connected to a centralized laser generator by fiber optic cables. Laser projection system 600 comprises a centralized laser light generator 604 configured to produce light for laser projection system 600 such that laser light generator 604 can provide laser light to one, two, or more than two projectors. Laser light generator 604 may comprise one or more light engines 606, which may include, as non-limiting examples, laser diodes such as direct edge-emitting laser diodes, GaN/InGaN laser diodes, GaAlAs/GaAs laser diodes, InP/InGaAsP laser diodes, double heterostructure lasers, quantum well lasers, quantum cascade lasers, separate confinement heterostructure lasers, distributed Bragg Reflector lasers, distributed feedback lasers, vertical-cavity surface-emitting lasers, vertical external-cavity surface-emitting lasers, external-cavity diode lasers, and/or any laser diode known in the art. Light engines 606 may also comprise light emitting diodes ("LEDs"). In some cases, a single light engine can provide multiple wavelengths of light, such as, for example and without limitation, red, green, and blue ("RGB") light. The light engine may also output one or more wavelengths of light in the visible spectrum, including, for example and without limitation, light of wavelengths 380 nm, 450 nm, 495 nm, 570 nm, 590 nm, 620 nm, and 750 nm, or any wavelength of light between any two of the aforementioned wavelengths. A plurality of light engines may be used in order to increase the overall illumination, colors, and/or light output of the laser projector system 600.

In some embodiments, light engines 606 produces a light in any or all of the wavelengths mentioned above (e.g., a broad spectrum of visible light and/or white light). The light may then be separated into RGB components. For example, a trichroic prism, dichronic prisms, light pass filters, and/or a color wheel may be used to separate the RGB components. The light may be separated into RGB components within laser light generator 604 and/or left projector 602 and right projector 603 and/or at other locations as desired. Laser light generator 604 may also include additional optical components, such as, for example, collimators, mirrors, couplers, phase adjusters, polarizers, etc., in order to focus, manipulate, and/or direct light as desired.

Laser light generator 604 may be coupled to cooling system 605, which may cool light engines 606, and/or any component of laser light generator 604. For example, the cooling system may be a cooling system disclosed in U.S. Pat. No. 7,938,543 and/or U.S. Pat. No. 6,751,027, each of which is incorporated herein by reference. Cooling system 605 may also be controlled by a user interface, wherein a user may control functional settings such as, for example and without limitation, power and/or temperature. Cooling system 605 may also be operably coupled to laser light generator 604 and/or processor/controller 601, which may further control its functional settings such as power and/or temperature.

Laser light generator 604 may be coupled to left projector 602 and right projector 603. Laser light generator 604 may also be coupled to additional projectors, for example laser light generator 604 may be coupled to 1, 2, 3, 4, 5, 6, 7, 8, 9, 10, or more than 10 additional projectors. Left projector 602 and right projector 603 may be used with a single screen environment, or a multiple screen environment. Left projector 602 and right projector 603 may also be located a distance away from laser light generator 604. For example, one or more of projectors 602 and 603 may be located less than 1 foot, less than 5 feet, less than 10 feet, less than 50 feet, less than 100 feet, less than 200 feet, less than 500 feet, and/or less than 1000 feet away from laser light generator 604.

In some embodiments, laser light generator 604 may be positioned inside the booth of a movie theater. Fiber optic cables run from laser light generator 604 to left projector 602 and right projector 603. For example, fiber optic cables may include optical fibers, which may comprise silica, fluoride glass, phosphate glass, chalcogenide glass, and/or any material known in the art for constructing optical fibers. The optical fibers may be single-mode or multi-mode. The fiber optic cables may also include liquid light cables configured to transmit light. For example, the cable may be filled with a water-based fluid (e.g., as used in 343 Cable RLS from BARCO) or a cable filled with any other fluid. Fiber optic cables may include fiber laser lines.

Projectors 602 and 603 may include filters 612 and 615, respectively. Filters 612 and 615 may be, for example and without limitation, light pass filters, notch filters, bandpass filters, and/or color wheels. They may also be coupled with prisms, such as trichroic prisms, dichronic prisms, and/or any other prism or combination of prisms known in the art to separate the light into components of certain wavelengths.

Light in left projector 602 and right projector 603 may strike a spatial-light-modulator chip, which may produce an image (e.g., a video frame). As an illustrative, non-limiting example, laser light generator 604 may direct light to left projector 602 and right projector 603. Inside left projector 602 and right projector 603, the light may pass through one or more filters, such as filters 612 and 615, respectively. The light from filters 612 and 615 may be directed to modulation panels 610 and 611 (e.g., a DMD, LCoS, LCD, etc.), respectively. Modulation panels 610 and 611 may be electrical input, optical output micro-electrical-mechanical systems. They may consist of actuable micromirrors constructed over a complementary metal-oxide semiconductor ("CMOS") memory substrate. To display a single image frame of a video, the CMOS substrate of modulation panels 610 and 611 may be programmed in blocks or groups. Once a block of memory is written, each mirror above the block is updated to its new state. This continues block-by-block until each memory chip is updated. At the end of the frame, all micromirrors may be reset to the "off" position at the same time. The light projected from modulation panels 610 and 611 may then be projected onto the movie screen as a video image.

Projectors 602 and 603 may be in further communication with one another for further synchronization and/or coordination. For example, they may be connected wirelessly or with a coaxial cable or other cable with a signal line and a ground. They may communicate their statuses, issue commands, and/or request information from one another.

In some embodiments, one of the projectors may be a master projector and the other a slave projector. Either left projector 602 or right projector 603 may perform either or both roles. However, for purposes of illustration, in some embodiments, left projector 602 may be the master projector and right projector 603 may be the slave projector.

Left projector 602 may transmit a synchronization signal over a cable and/or wirelessly to right projector 603. Accordingly, projectors 602 and 603 project video at least in part based on the synchronization signal. As used herein, synchronized video includes video from different projector systems having corresponding frames that are displayed within a sufficiently small time window from one another so as to be displayed substantially simultaneously. In some embodiments, synchronized video includes video wherein corresponding frames are displayed such that a time between the display of the synchronized frames is less than or equal to about 1 ms, less than or equal to about 500 µs, less than or equal to about 350 µs, less than or equal to about 250 µs, or less than or equal to about 200 µs. Such synchronization can be referred to as having sub-frame accuracy in its synchronization. For example, for a video that has a frame rate of 30 fps (or 60 fps), each frame of video is displayed for about 33.3 ms (or 16.7 ms). Videos that are synchronized to within a fraction of the time a video frame is displayed can be said to have sub-frame accuracy. For example, sub-frame accuracy can include synchronization that has a latency between corresponding frames that is less than about 10% of the frame rate, less than about 5% of the frame rate, less than about 1% of the frame rate, or less than about 0.1% of the frame rate.

In some embodiments, projectors 602 and 603 include synchronization modules 616 and 617, respectively, configured to generate and receive synchronization signals, transmit the synchronization signal (e.g., over a synchronization cable), and/or process the synchronization signal. Synchronization signals can be generated independent of synchronization information provided in the digital files related to the composition (e.g., video and/or sound presentations). For example, the synchronization signal can be generated based at least in part on the output of a frame buffer in the projector, prior to (or in parallel with) the video signal being inputted in the projector. The synchronization signal may also comprise other information for coordinating the image projected on the screen. For example, the synchronization signal may indicate the color (e.g., contrast, hue, sharpness, saturation, RGB composition, etc.) and/or polarization state of left projector 602 and right projector 603. In some cases, the synchronization signal may be used to adjust polarizer 622, polarizer 623, filters 612, filters 615, and/or other components of left projector 602 and right projector 603.

In some embodiments, one of projectors 602 and 603 can control display of a video in units of frames and synchronize the video frames for projectors 602 and 603 using a time code for each frame, the time code being carried by the synchronization signal. Accordingly, the projectors 602 and 603 can accurately synchronize the video projected on a screen based at least in part on the time code for each frame in the synchronization signal.

Projectors 602 and 603 may optionally include processors/controllers 618 and 619, respectively, which may be configured to provide computational power and to direct and coordinate the execution of functions sufficient to provide the targeted and desired functionality of projectors 602 and 603. For example, processors/controllers 618 and 619 may control and/or program modulation panels 610 and 611, respectively, to output desired video frames. They may coordinate, position, and/or control filters 612 and 615, respectively, to adjust the light striking modulation panels 610 and 611, respectively. Processors/controllers 618 and 619 may send direct, generate, coordinate, and/or process received signals and information, and/or otherwise support and control synchronization modules 616 and 617, respectively. Processors/controllers 618 and 619 may also adjust the lenses of left projector 602 and right projector 603, respectively, in order to tune the projected image on the movie screen. They may also adjust the polarization and/or coloring of the image outputted from left projector 602 and right projector 603 by adjusting, for example, polarizers 622 and 623 of projectors 602 and 603. In some embodiments, processors/controllers 618 and 619 may be further coupled and/or synchronized with processor/controller 601.

Projectors 602 and 603 may project light with different polarization states from each other onto a screen (e.g., a non-depolarizing screen). Typically, laser projection systems generate an image by combining a single set of RGB primary colors. This is known as 3-Primary ("3P") laser projection, and it is often used in 2D presentations. In some cases, in order to create a 3D presentation, three additional laser primary colors may be used to create a 6-Primary ("6P") laser system.

The polarization state of the three primary colors RGB, which are projected by each individual projector (e.g., Projectors 602 and 603), may be different for each projector. In this way, the image on the screen consists of six primary colors, $R_1$, $R_2$, $G_1$, $G_2$, $B_1$, and $B_2$, wherein the colors with subscript 1 represent one polarization and the colors with subscript 2 represent a second polarization. Left projector 602 and right projector 603 may be tuned with each other such that the images outputted from the projectors converge into a synchronized image. For example, in some cases, projectors 602 and 603 are in active communication with one another using synchronization modules 616 and 617.

Figure 4:
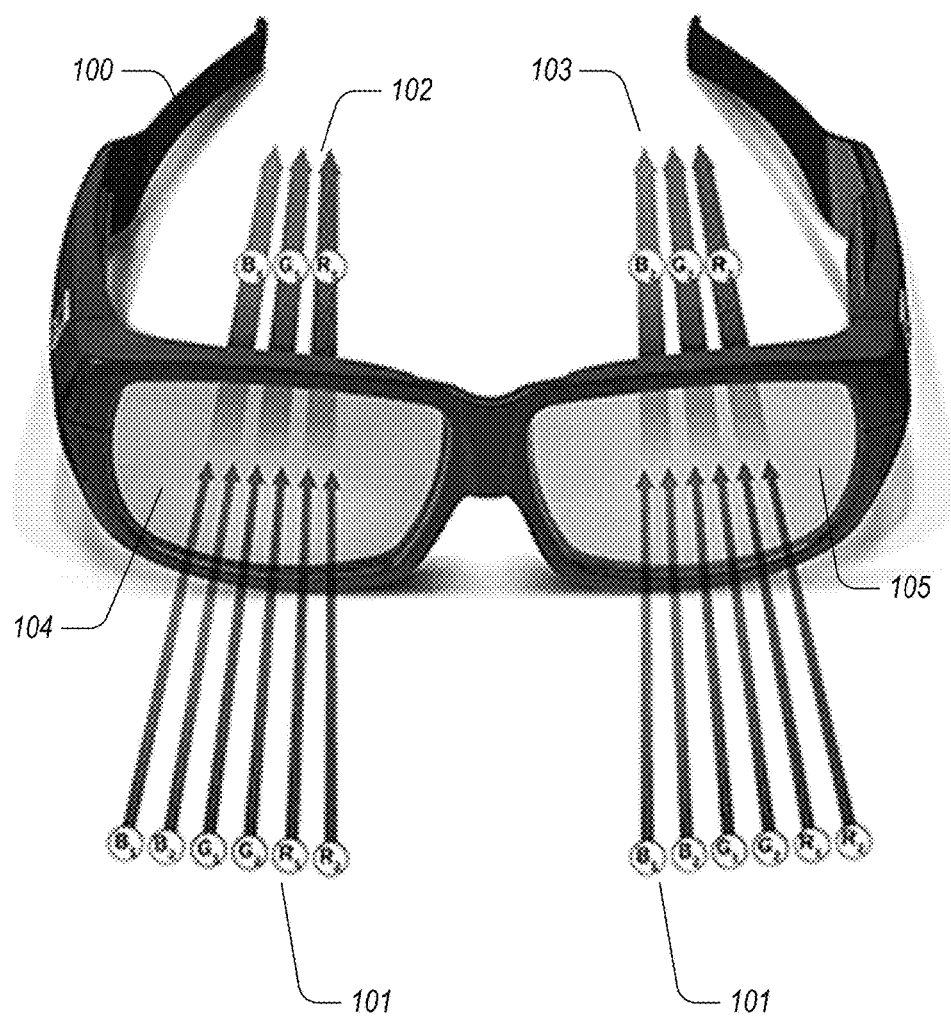
FIG. 4 illustrates an example pair of 3D glasses that may be used with a 6P laser system.

With a pair of glasses equipped with substantially orthogonally polarized filters, respectively, one filter for the left eye and one filter for the right eye, the left eye may receive only the images from one projector, while the right eye may receive only the images from the other projector. For example, FIG. 4 illustrates an example pair of 3D glasses that may be used with a 6P laser system. The projector system projects light which reflects off the projector screen as light 101. Light 101 comprises six RGB primary colors, $R_1$, $R_2$, $G_1$, $G_2$, $B_1$, and $B_2$. 3D glasses 100 have left lens 104 and right lens 105. Each lens is polarized such that only one set RGB primary colors passes through the lens to the eye. For example, left lens 104 is polarized so $R_1$, $G_1$, and $B_1$ pass through as light 102. Right lens is polarized so that $R_2$, $G_2$, and $B_2$ pass through as light 103.

Returning to FIG. 2, Projectors 602 and 603 may also include cooling systems 613 and 614, respectively, which function to cool modulation panels 610 and 611, respectively, and the other components of the projectors. Cooling systems 613 and 614 may have similar or substantially similar functionality and components as cooling system 605 described above.

Projectors 602 and 603 may optionally have a user interface or a control program accessible over a network connection that allows a user or other system to provide commands, monitor statuses of the projectors, and/or request information from the projectors.

Each of projectors 602 and 603 may also include projector lenses configured to zoom and focus the projection image onto the screen. The projector lens may be a convex or concave lens. They may also include, for example and without limitation, zoom lenses, parfocal lenses, auto-focus lenses, short-throw lenses, long-throw lenses, converging lenses, fisheye lenses, and/or any lenses known in the art for adjusting the projected images from projectors.

Projectors 602 and 603 and laser light generator 604 may be operatively coupled to processor/controller 601. In some embodiments, processor/controller 601 may be operably coupled to video content 608. Video content 608 may be internal or external to laser projection system 600. It may have video processing electronics which deliver images or video streams to processor/controller 601. For example, and without limitation, such video content 608 can include a REDRAY player, computer, DVD player, BLU-RAY player, video game console, smartphone, digital camera, video camera, or any other source that can provide a video stream or image. Video content 608 may also comprise encrypted contents, such as a digital cinema package ("DCP"), key delivery mechanisms ("KDMs"), and/or digital key distribution masters ("D-KDMs"). Video content 608 may also comprise files, including material exchange format ("MXF") files, digital cinema initiative distribution master ("DCDM") files, J2K frames, REDCODE, Tagged Image File Format ("TIFF"), Tag Image File Format/Electronic Photography ("TIFF/EP"), Digital Negative files ("DNG"), Extensible Metadata Platform files ("XMP"), Exchangeable image file format ("Exif"), sound and/or video content files, and/or any file format mentioned in this disclosure and/or used to deliver cinema content. Video information from video content 608 can be delivered to the processor/controller 601 through conventional cabling, including, for example, HDMI cables, component cables, composite video cables, coaxial cables, Ethernet cables, optical signal cables, other video cables, or any combination of these. In some embodiments, video content 608 is digital information stored on a readable medium, including hard disks, solid-state drives (SSDs), optical discs, flash memory devices, and the like. In some embodiments, processor/controller 601 can be configured to read any of the aforementioned file types. Video content 608 can deliver video streams to processor/controller 601 where such video streams include digital or analog information, and where the streams comprise information conforming to a standard and/or include image data at a particular resolution level, such as HD (720 p, 1080i, 1080p), REDRAY, 2K (e.g., 16:9 (2048×1152 pixels), 2:1 (2048×1024 pixels), etc.), 4K (e.g., 4,096×2,540 pixels, 16:9 (4096×2304 pixels), 2:1 (4096×2048), etc.) 4K RGB, 4K Stereoscopic, 4.5K horizontal resolution, 3K (e.g., 16:9 (3072×1728 pixels), 2:1 (3072×1536 pixels), etc.), 5K (e.g., 5120×2700), Quad HD (e.g., 3840×2160 pixels) 3D HD, 3D 2K, SD (480i, 480p, 540p), NTSC, PAL, or other similar standard or resolution level. As used herein, in the terms expressed in the format of xK (such as 2K and 4K noted above), the "x" quantity refers to the approximate horizontal resolution. As such, "4K" resolution can correspond to at least about 4000 horizontal pixels and "2K" can correspond to at least about 2000 or more horizontal pixels. Laser projector system 600 may have a modular design such that it can updated and/or upgraded providing new or different functionality. For example, a processor/controller 601 can be changed or added to change the allowed input formats to the laser projector system 600. As another example, processor/controller 601 can be updated to handle new video decryption from protected data inputs.

Processor/controller 601 may also be operably coupled to laser light generator 604, left projector 602, and right projector 603. Processor/controller 601 can be configured to provide computational power and to direct and coordinate the execution of functions sufficient to provide the targeted and desired functionality of the laser projection system 600. For example, processor/controller 601 may control and/or program modulation panels 610 and 611 to output desired video frames. It may control the brightness, color, and/or any characteristic and/or operative feature of light engines 606. Processor/controller 601 may also adjust the lenses of left projector 602 and right projector 603 in order to tune the projected image on the movie screen. It may also adjust the polarization and/or coloring of the image outputted from left projector 602 and right projector 603 by adjusting, for example, polarizers of projectors 602 and 603.

Processor/controller 601 may be operably coupled to memory 609, which can be used to store digital files, (e.g., a DCP, software, executable instructions, configuration settings, calibration information, and the like). Memory 609, which may include both read-only memory (ROM) and random access memory (RAM), may provide instructions and data to processor/controller 601. A portion of memory 609 may include non-volatile random access memory (NVRAM). Processor/controller 601 typically performs logical and arithmetic operations based on program instructions stored within memory 609. Instructions in memory 609 may be executable to implement the methods described herein.

In some embodiments, processor/controller 601 may also be coupled to a user interface or a control program accessible over a network connection that allows a user and/or other system to provide commands to laser projection system 600, to monitor a status of laser projection system 600, and/or to request information from laser projection system 600.

Figure 3:
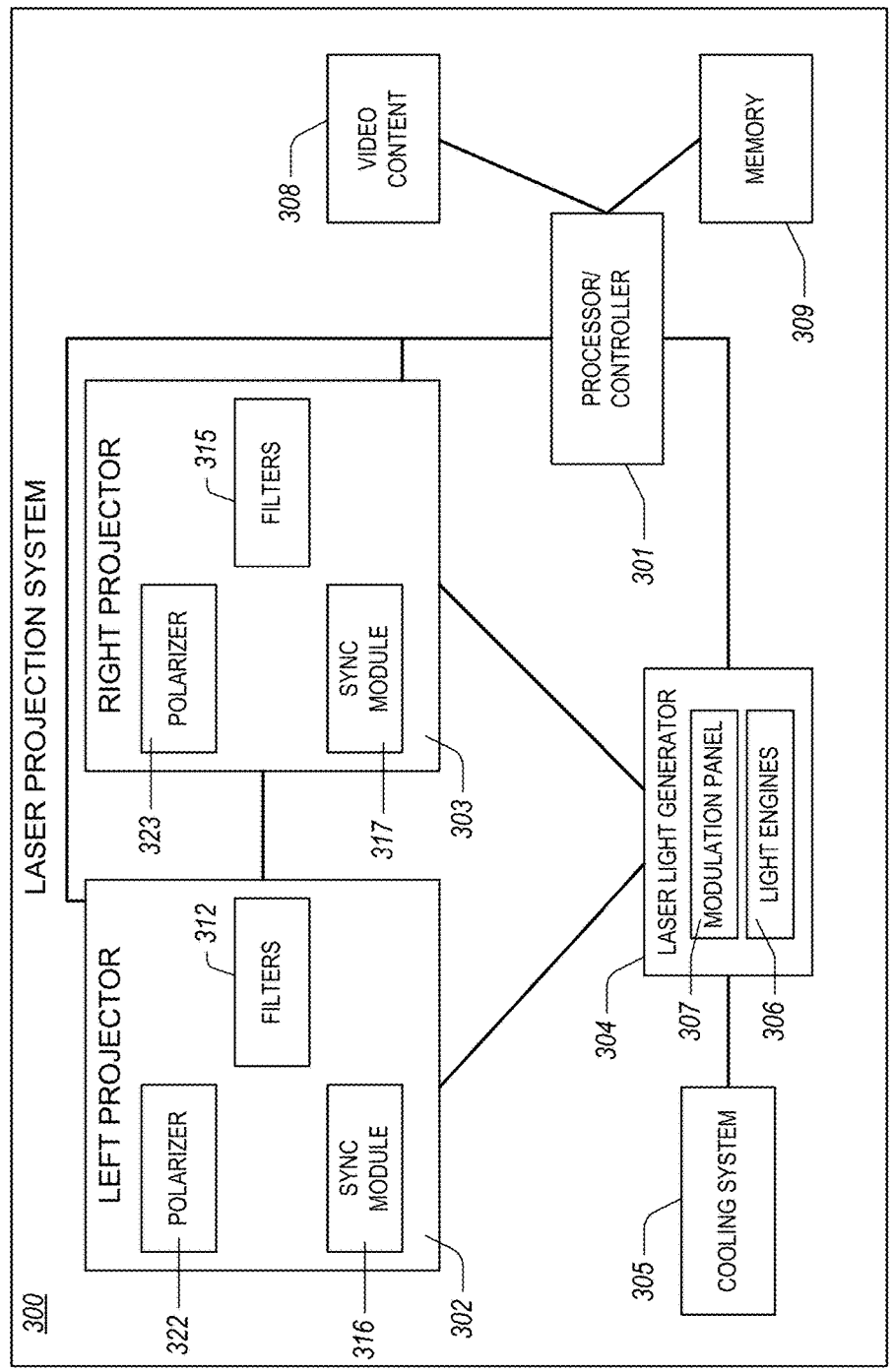
FIG. 3 illustrates an example functional block diagram of some embodiments where video components are processed with a modulation panel (e.g., a DMD, LCoS, LCD, etc.) located remotely from the projectors.

FIG. 3 illustrates an example functional block diagram of some embodiments where video components are processed with a modulation panel (e.g., a DMD, LCoS, LCD, etc.) located remotely from the projectors. Laser projection system 300 is a system similar to laser projection system 600 (FIG. 2), wherein similar components perform similar functions as described above with respect to FIG. 2. For example, laser projection system 300 comprises processor/controller 301, video content 308, memory 309, and cooling system 305, each of which functions as the analogous structure in laser projection system 600 (FIG. 2). However, laser light generator 304 may now include modulation panel 307 (e.g., a DMD that operates similarly to modulation panels 610 and 611 (FIG. 2) described above) as well as light engines 306. Accordingly, much of the generation of the video content may be performed with laser light generator 304, which may be positioned in a booth. Left projector head 302 and right projector head 303 may be positioned as desired outside the booth or inside the booth. Bundles of optical fibers may connect laser light generator 304 to left projector head 302 and right projector head 303 in order to carry video content to left projector head 302 and right projector head 303.

Because the video content is transmitted to projector heads 302 and 303, they may contain fewer optical components. For example, left projector head 302 and right projector head 303 may include filters 312 and 315, respectively. Filters 312 and 315 may be used to change the video projected from each of the projector heads 302 and 303. In some cases, filters 312 and 315 may include light pass filters, bandpass filters, notch filters, and/or color wheels. They may also be coupled to prisms, such as trichroic prisms, dichronic prisms, to separate the light into RGB components. Left projector head 302 and right projector head 303 may also include polarizers 322 and 323, respectively. The polarization state of the three primary colors, RGB, which are projected by each individual projector head, may be different for each projector head for 3D viewing, as described above.

Left projector head 302 and right projector head 303 may also be in active communication over a wire or wirelessly. In some embodiments, projector heads 302 and 303 include synchronization modules 316 and 317, respectively, configured to generate and receive synchronization signals, transmit the synchronization signal (e.g., over a synchronization cable), and/or process the synchronization signal. The synchronization signal can be generated independent of synchronization information provided in the digital files related to the composition (e.g., video and/or sound presentations). For example, the synchronization signal may indicate the color (e.g., contrast, hue, sharpness, saturation, RGB composition, etc.) and/or polarization state of left projector head 302 and right projector head 303. In some cases, the synchronization signal may be used to adjust polarizer 322, polarizer 323, filters 312, filters 315, and/or other components of left projector 302 and right projector 303. Left projector head 302 and right projector head 303 may also include any of the other components described in this disclosure, including, but not limited to, lenses, cooling systems, processor/controllers, and/or additional optical components.

Figure 5:
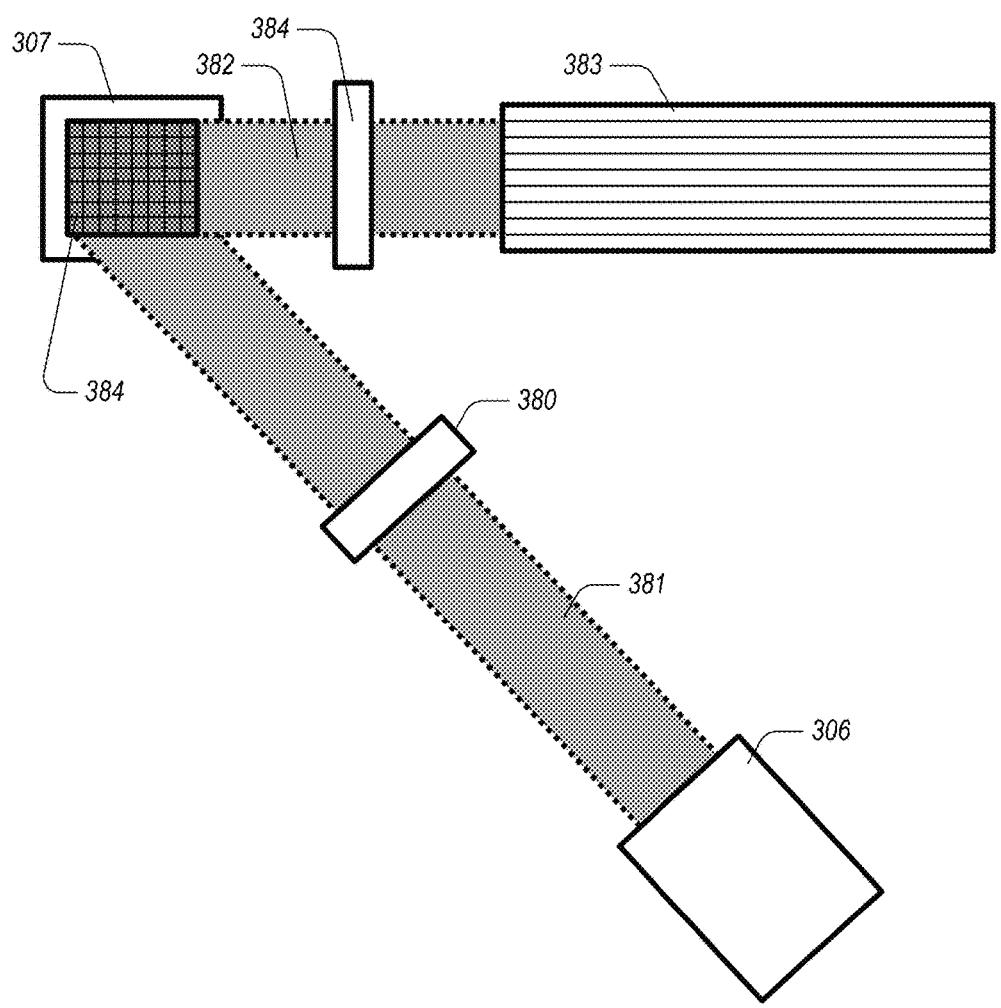
FIG. 5 illustrates an example diagram of video being transmitted from the example laser light generator of FIG. 3.

FIG. 5 illustrates an example diagram of video being transmitted from the example laser light generator of FIG. 3. Light engines 306 produces light 381. Light 381 may pass through optical elements 380 (e.g., lenses, collimators, filters, etc.), which focuses light 381 onto modulation panel 307. In some cases, the focusing of light 381 onto modulation panel 307 illuminates the surface of modulation panel 307. The illumination may be even or uneven across the surface of modulation panel 307, be patterned or non-patterned, and/or be full spectrum or be specific wavelengths and/or ranges of wavelengths of light. Video frame 382 is generated based on the state of the mirrors of modulation panel 307 (e.g., mirror 384), as described above. Video frame 382 is then carried by cable bundle 383. In some cases, cable bundle 383 may comprise a plurality of fiber optic cables, each configured to transmit a pixel of video frame 382 or one or more pixels of video frame 382. Each fiber optic cable of cable bundle 383 may then be split to transmit each pixel of video frame 382 to left projector head 302 and right projector head 303. In some cases, coupling optics 384 (e.g., coupling lenses and/or projection lens) may optionally be used to project video frame 382 to cable bundle 383.

Figure 6:
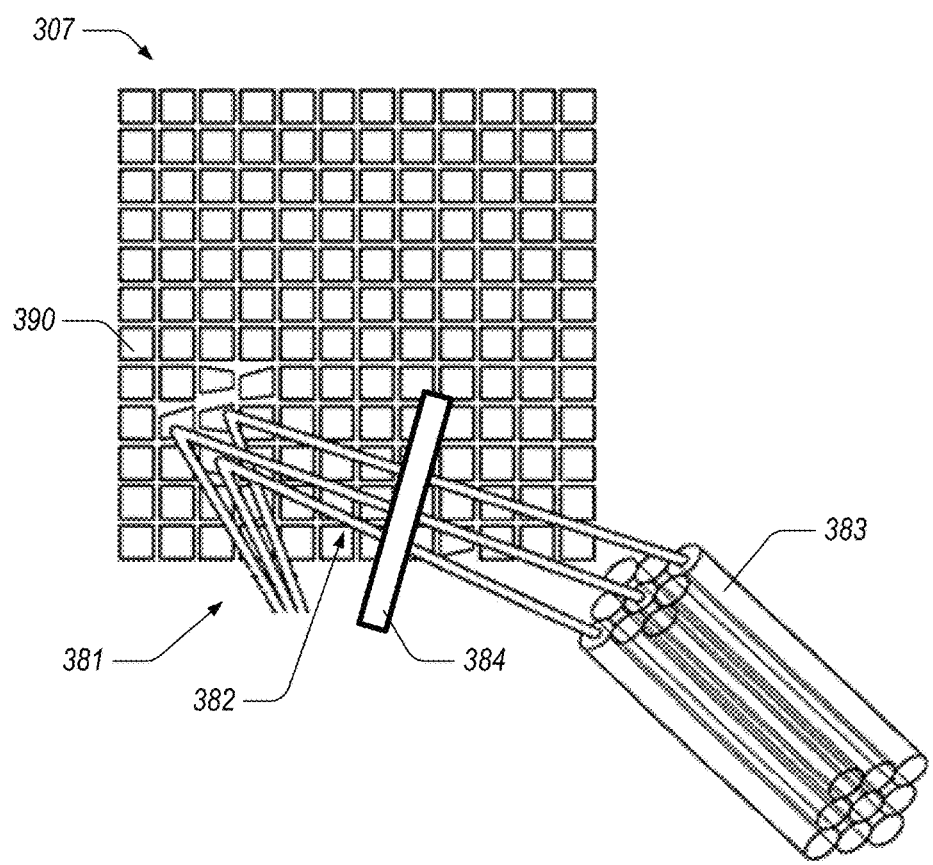
FIG. 6 illustrates a close-up view of the light reflected from the example modulation panel of FIG. 5.

FIG. 6 illustrates a close-up view of the light reflected from the example modulation panel of FIG. 5. For illustrative purposes, only a few beams of light are shown. However, typically, the entire modulation panel 307 may be illuminated (e.g., a plurality of beams may strike modulation panel 307). Light 381 reflects off mirrors (e.g., mirror 390) of modulation panel 307. The light is reflected to produce video frame 382, which may then pass through coupling optics 384 and transmitted through cable bundle 383 to projector heads.

Figure 7:
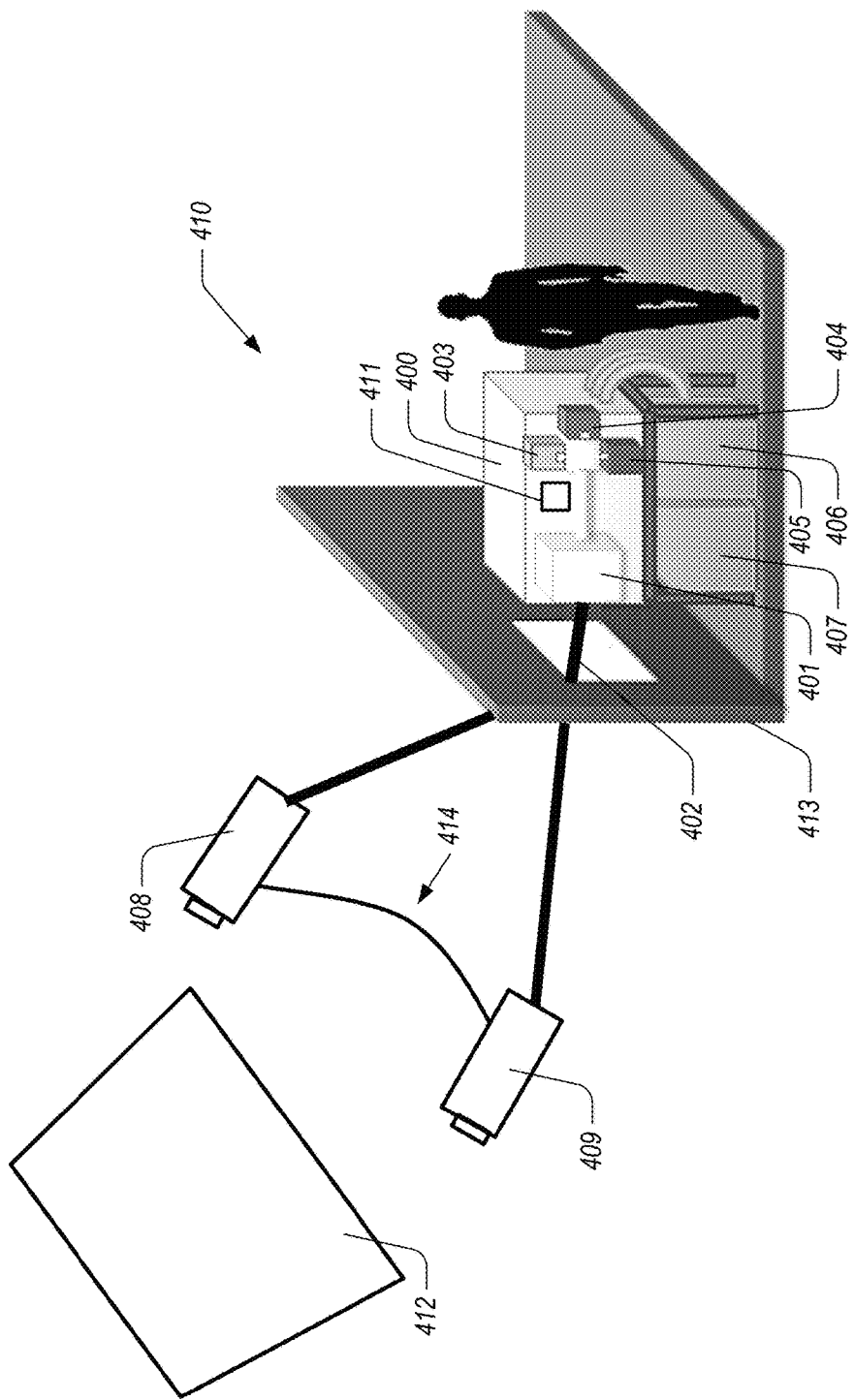
FIG. 7 illustrates an example embodiment with a centralized laser light generator in a booth connected to two projectors outside of a booth.

FIG. 7 illustrates an example embodiment with a centralized laser light generator in a booth connected to two projectors outside of a booth. The construction and/or function of the foregoing elements may be the same or substantially similar to the analogous elements described above. For example, laser projection system 410 includes laser light generator 400. Laser light generator 400 is located within booth 413 and has light engines 403, 404, and 405. In some embodiment, each light engine 403, 404, and 405 may output one or more wavelengths of visible light. For example, light engine 403 may output green light, light engine 404 may output blue light, and light engine 405 may output red light.

Light engines 403, 404, and 405 may be coupled to processor/controller 411 that controls the brightness, color, and/or characteristics and/or operative features of the light generated by each engine. Light engines 403, 404, and 405 and processor/controller 411 may be coupled to additional circuitry in module 401, which may include additional optical components, such as, for example, collimators, mirrors, couplers, phase adjusters, polarizers, etc., in order to focus, manipulate, and/or direct light as desired.

Laser light generator 400 may connect to right projector 408 and left projector 409 using fiber optic cables 402, which transmit light to each of the projectors. Projectors 408 and 409 may include polarizers, modulation panels, cooling systems, filters, synchronization modules, processors/controllers, and other components as previously described with respect to left projector 602 and right projector 603 above. Projectors 408 and 409 may project video onto screen 412. Projectors 408 and 409 may also be connected by cable 414, which allows for further communication for synchronization and/or coordination.

Chillers 406 and 407 may be part of a cooling system similar to cooling system 600. Chillers 406 and 407 may be positioned along with laser light generator 400 in booth 413. In some cases, chillers 406 and 407 may be positioned below (e.g., the side proximal to the floor) laser light generator 400, as illustrated in FIG. 4. Chillers 406 and 407 may also be positioned to the front side (e.g., the side proximal to screen 412), back side (e.g., the side distal to screen 412), the left and right side (e.g., the sides between the proximal and distal sides on the left or right), the top side (e.g., the side proximal to the ceiling), between any of the aforementioned sides, within the chassis of laser light generator 400, and/or at a position away from laser light generator 400, including positioned anywhere in booth 413 or at a position outside booth 413.

Figure 8:
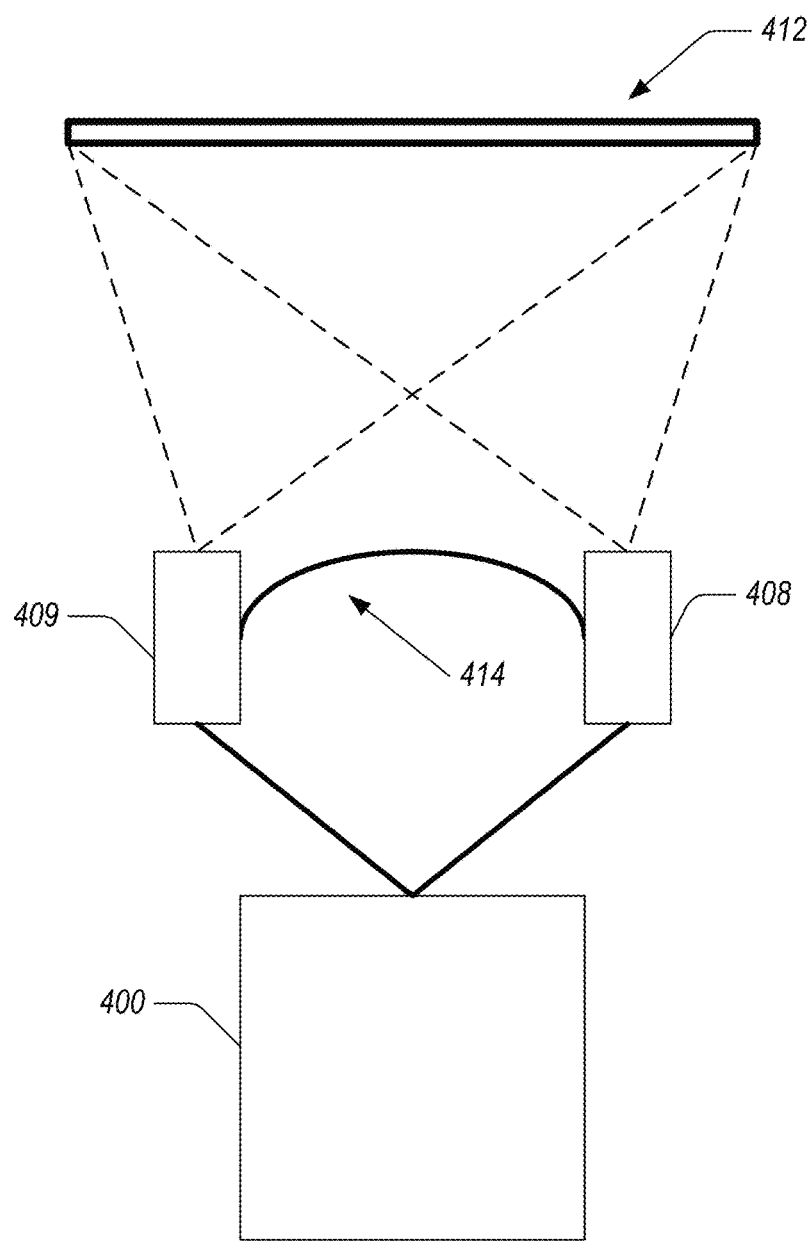
FIG. 8 illustrates aerial top-down view of the example embodiment of FIG. 7.

FIG. 8 illustrates aerial top-down view of the example embodiment of FIG. 7. Left projector 409 and right projector 408 may be tuned with each other such that the images outputted from the projectors converge into a synchronized image on screen 412. For example, both projector 408 and 409 may project light with a different polarization state on screen 412 for 3D viewing, as described above.

Figure 9:
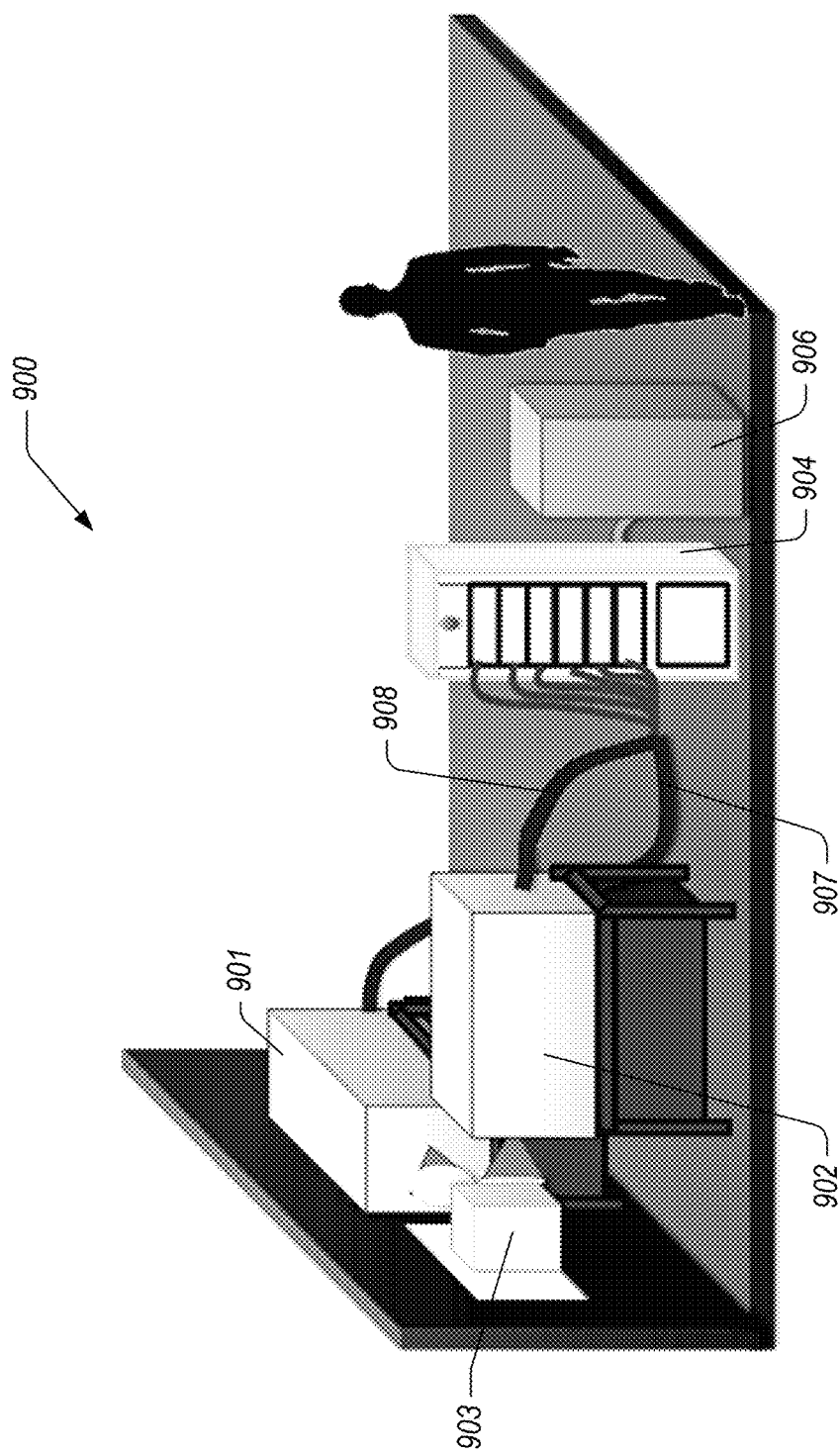
FIG. 9 illustrates an example embodiment with two projectors coupled to a centralized laser light generator in the booth of a cinema theater.

FIG. 9 illustrates an example embodiment with two projectors coupled to a centralized laser light generator in the booth of a cinema theater. Projector system 900 comprises projector 901, projector 902, mirror(s) 903, centralized laser light generator 904, and chiller 906, each of which functions as the analogous structure in any of the above described laser projection systems. Projectors 901 and 902 connect laser light generator 904 through fiber optic cables 907 and 908, respectively. Fiber optic cables 907 and 908 may include any fiber optic cable mentioned in this disclosure, and transmit light from laser light generator 904 to each of projectors 901 and 902. Laser light generator 904 may be coupled to external chiller 906, which may provide cool air for cooling. Mirror(s) 903 may comprise a single mirror or a dual mirror. Typically, mirror(s) 903 may be fixed in position, or attached to actuators that adjust their positions. Mirror(s) 903 may be used, to change the optical path of the projected images from projectors 901 and 902 in order to converge the right eye and left eye images projected from each of projectors 901 and 902, respectively, into a unified 6P image projected onto the movie screen.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products. Additionally, other implementations are within the scope of the following claims. In some cases, the actions recited in the claims can be performed in a different order and still achieve desirable results.

What is claimed is:

1. A 3D laser projection system comprising:
    a laser light generator comprising one or more laser diodes configured to generate white light;
    a left projector connected to the laser light generator by a first fiber optic cable and located a first defined distance from the laser light generator, the left projector comprising:
        a filter configured to receive and filter the white light from the laser light generator,
        a modulation panel configured to receive the filtered light and to generate a first video image projected on a screen,
        a digital polarizer having a first polarization, and
        a synchronization module configured to generate a waveform encoding synchronization information; and
    a right projector connected to the laser light generator by a second fiber optic cable and located a second predefined distance from the laser light generator, the right projector comprising:
        a filter configured to receive and filter the white light from the laser light generator,
        a modulation panel configured to receive the filtered light and generate a second video image projected onto the screen, the second video image overlapping the first video image,
        a digital polarizer having a second polarization that is not the same as the first polarization, and
        a synchronization module configured to receive the waveform from the left projector, wherein right projector is configured to generate the second video image based on at least the received waveform.

2. The system of claim 1, wherein the right projector is connected to the left projector with a coaxial cable configured to transmit the waveform generated by the left projector.

3. The system of claim 1, wherein the left projector is configured to transmit the generated waveform wirelessly.

4. The system of claim 1, wherein the right projector further comprises a cooling system configured to cool the laser light generator.

5. The system of claim 1, wherein the left projector further comprises a cooling system configured to cool the laser light generator.

6. The system of claim 1, wherein the laser light generator is located in a room separate from at least one of the left projector and right projector.

7. The system of claim 1, wherein the first defined distance and second defined distance are approximately the same.

8. The system of claim 1, wherein the first video image and second video image are projected on the screen substantially simultaneously.

9. The system of claim 1, wherein an amount of time between generating the first and second video images is less than or equal to about 1 ms based in part on the received waveform.

10. The system of claim 1, wherein the left projector is configured to coordinate a characteristic of the light for projecting the second video image with the characteristic of the light for projecting the first video image based on the synchronization information.

11. The system of claim 10, wherein the characteristic of the light is at least one of an aspect of the color of the light and a polarization state of the light.

12. The system of claim 1, wherein the synchronization information encoded in the waveform comprises a time code of the first video image, and wherein the right projector is configured to generate the second video image based on the time code of the first video image.

13. The system of claim 1, wherein the filter of at least one of the left and right projectors is configured to separate the white light into a red light component, a green light component, and a blue light component, wherein the respective generated video image comprises the red light component, the green light component, and the blue light component.

14. The system of claim 1, wherein the first video image and second video image combine on the screen to produce a third video image comprising at least three different properties of light, wherein the each property of light is at least one of a color of light, the first polarization, and the second polarization.

15. The system of claim 14, wherein the third video image comprises at least six properties of light, wherein the left projector is configured to generate the first video image comprising at least three colors of light having the first polarization and the right projector configured to generate the second video image comprising at least three colors of light having the second polarization.

16. The system of claim 1, wherein the first video image projected on the screen is viewable through a first lens of an eyewear and the second video image projected on the screen is viewable through a second lens of the eyewear, wherein the first lens and the second lens are polarized to correspond to the first and second polarizations, respectively.

\* \* \* \* \*